US012640618B2

(12) United States Patent
Riess et al.

(10) Patent No.: US 12,640,618 B2
(45) Date of Patent: May 26, 2026

(54) ELECTRIC MACHINE WITH ELECTRIC CONNECTION ELEMENT

(71) Applicant: Schaeffler Technologies AG & Co. KG, Herzogenaurach (DE)

(72) Inventors: Stefan Riess, Kaufering (DE); Michael Menhart, Igling (DE); Carsten Sonntag, Gauting-Königswiesen (DE); Johann Oswald, Eschenlohe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 189 days.

(21) Appl. No.: 18/554,507

(22) PCT Filed: Apr. 8, 2022

(86) PCT No.: PCT/DE2022/100263
§ 371 (c)(1),
(2) Date: Oct. 9, 2023

(87) PCT Pub. No.: WO2022/214141
PCT Pub. Date: Oct. 13, 2022

(65) Prior Publication Data
US 2024/0204609 A1 Jun. 20, 2024

(30) Foreign Application Priority Data
Apr. 10, 2021 (DE) .......................... 102021108951.4

(51) Int. Cl.
*H02K 5/22* (2006.01)
*H02K 9/197* (2006.01)
*H02K 16/04* (2006.01)
(52) U.S. Cl.
CPC ............. *H02K 5/225* (2013.01); *H02K 9/197* (2013.01); *H02K 16/04* (2013.01)

(58) Field of Classification Search
CPC ..... H02K 1/2793; H02K 1/2795–2796; H02K 5/22; H02K 5/225; H02K 9/197; H02K 16/04; H02K 21/24
See application file for complete search history.

(56) References Cited

U.S. PATENT DOCUMENTS

| | | | | |
|---|---|---|---|---|
| 2008/0268695 A1* | 10/2008 | Dieterle | ................. | H01R 11/26 439/352 |
| 2010/0216332 A1* | 8/2010 | Garriga | .................... | H01R 4/34 439/814 |
| 2022/0115924 A1* | 4/2022 | Zhang | .................. | H02K 1/2795 |

FOREIGN PATENT DOCUMENTS

| | | |
|---|---|---|
| CN | 110832751 A | 2/2020 |
| CN | 112041576 A | 12/2020 |

(Continued)

OTHER PUBLICATIONS

Randi, Machine Translation of FR3004600, Oct. 2014 (Year: 2014).*

(Continued)

*Primary Examiner* — Eric Johnson
(74) *Attorney, Agent, or Firm* — Volpe Koenig

(57) ABSTRACT

An electric machine, for an electric drive train in a motor vehicle, includes a rotor rotatably mounted relative to a stator, the stator having a first stator member with a first stator winding arranged within a first chamber, at least part of which is enclosed by a delimiting first casing component. The first casing component contains an electric connection element with a contacting member and a reception sleeve which extend therethrough such that a first portion of the reception sleeve protrudes into the first chamber and a second portion of the contacting member is contactable from the side of the first casing component facing away from the first chamber. The contacting member is secured in the reception sleeve, which is accommodated in the first casing (Continued)

component. The contacting body is fixed in the receiving sleeve, which is received in the first housing component.

16 Claims, 4 Drawing Sheets

(56) References Cited

FOREIGN PATENT DOCUMENTS

| | | | |
|---|---|---|---|
| CN | 112383193 | 2/2021 | |
| DE | 102015102223 A1 | 8/2016 | |
| DE | 102015013018 | 4/2017 | |
| DE | 102017207215 | 10/2018 | |
| EP | 3157138 | 7/2018 | |
| FR | 2799053 A1 | 3/2001 | |
| FR | 3004600 A1 * | 10/2014 | .............. H02K 9/19 |
| WO | 2001011755 | 2/2001 | |
| WO | 2015090688 A1 | 6/2015 | |
| WO | 2016055480 A1 | 4/2016 | |
| WO | 2019241765 | 12/2019 | |

OTHER PUBLICATIONS

Erik Schneider, Frank Fickl, Bernd Cebulski and Jens Liebold with the title: "Hochintegrativ und Flexibel Elektrische Antriebseinheit für E-Fahrzeuge" [Highly integrative and flexible electric drive unit for e-vehicles], ATZ magazine, vol. 113, pp. 360-365, May 2011.

* cited by examiner

ELECTRIC MACHINE WITH ELECTRIC CONNECTION ELEMENT

CROSS-REFERENCE TO RELATED APPLICATIONS

This application is the U.S. National Phase of PCT Appln. No. PCT/DE2022/100263, filed Apr. 8, 2022, which claims priority from German Patent Application No. 10 2021 108 951.4, filed Apr. 10, 2021, the entire disclosures of which are incorporated by reference herein.

TECHNICAL FIELD

The present disclosure relates to an electric machine, in particular for an electrically operated drive train of a motor vehicle, comprising a rotor rotatably mounted relative to a stator, wherein the rotor has a rotor shaft with at least one rotor body arranged on the rotor shaft in a non-rotatable and non-displaceable manner and the stator comprises at least one first stator body, wherein the first stator body has a first stator winding, which is arranged within a first chamber which is enclosed at least partially by a delimiting first housing component.

BACKGROUND

Electric motors are increasingly being used to drive motor vehicles in order to create alternatives to internal combustion engines that require fossil fuels. Significant efforts have already been made to improve the suitability of electric drives for everyday use and also to be able to offer users the driving comfort they are accustomed to.

A detailed description of an electric drive can be found in an article in the ATZ magazine, Volume 113, May 2011, pages 360-365 by Erik Schneider, Frank Fickl, Bernd Cebulski and Jens Liebold with the title: Hochintegrativ und Flexibel Elektrische Antriebseinheit für E-Fahrzeuge [Highly Integrative and Flexible Electric Drive Unit for E-Vehicles]. This article describes a drive unit for an axle of a vehicle, which comprises an electric motor that is arranged concentrically and coaxially with a bevel gear differential, wherein a switchable 2-speed planetary gear set is arranged in the drive train between the electric motor and the bevel gear differential, which is also positioned coaxially to the electric motor or the bevel gear differential or spur gear differential. The drive unit is very compact and allows for a good compromise between climbing ability, acceleration and energy consumption due to the shiftable 2-speed planetary gear set. Such drive units are also referred to as e-axles or electrically operable drive trains.

In addition to purely electrically operated drive trains, hybrid drive trains are also known. Such drive trains of a hybrid vehicle usually comprise a combination of an internal combustion engine and an electric motor, and enable—for example in urban areas—a purely electric mode of operation with both sufficient range and availability, in particular when driving overland. In addition, there is the possibility of driving the internal combustion engine and the electric motor at the same time in certain operating situations.

In the development of electric machines intended for e-axles or hybrid modules, there exists a continuing need to increase their power densities, such that the cooling of the electric machines required for this purpose is becoming increasingly important. Due to the necessary cooling capacities, hydraulic fluids, such as cooling oils, have become established in most concepts for the dissipation of heat from the regions of an electric machine that are subject to thermal loads.

The jacket cooling and winding head cooling, for example, are known from the prior art for implementing a cooling solution for electric machines by means of hydraulic fluids. While jacket cooling transfers the heat generated on the outer surface of the stator laminated core into a cooling circuit, with winding head cooling, the heat transfer into the fluid takes place directly on the conductors outside the stator laminated core in the region of the winding heads.

Further improvements are provided by separate cooling channels, which are introduced both into the laminated core of the stator (see, for example, EP3157138 A1) and into the groove in addition to the conductors (see, for example, Markus Schiefer: Indirekte Wicklungskühlung von hochausgenutzten permanenterregten Synchronmaschinen mit Zahnspulenwicklung [Indirect Winding Cooling of Highly Utilized Permanent Magnet Synchronous Machines with Tooth Coil Winding], dissertation, Karlsruhe Institute of Technology (KIT), 2017).

Concepts are also known in which hydraulic fluid flows directly around the windings in order to increase power density. An improved cooling with direct contact of hydraulic fluid and conductor in the groove is already known in principle from the prior art. For example, DE102015013018 A1 describes a solution for electric machines with a single tooth winding, wherein the fluid flows directly around the windings, which are wound around the teeth.

For good electrical contacting and mechanical connection between a "wet side" and a "dry side" of such a direct-cooled winding, electrical contacting bodies are usually provided which, for example, allow electric conductors to be plugged on or in and thus connect them both electrically and mechanically. This requires a defined preload force of the contacting. This preload force is limited by the mechanical load-bearing capacity of the connecting element and the contact region. The mechanical load-bearing capacity of the connecting element is achieved, for example, by means of strain hardening, the addition of foreign atoms or precipitation hardening. These measures, however, impede the flow of electrons in the material. In the materials used, a good electrical conductivity is therefore at odds with a good mechanical load-bearing capacity.

SUMMARY

The object of the disclosure is to provide an electric machine which has a safe electrical as well as mechanical contact between a wet side and a dry side. Furthermore, the electric machine should be cost-effective to manufacture and easy to assemble.

This object is achieved with one or more of the measures disclosed herein.

Further advantageous embodiments are described below and in the claims.

This object is achieved by an electric machine, in particular for an electrically operated drive train of a motor vehicle, comprising a rotor rotatably mounted relative to a stator, wherein the rotor has a rotor shaft with at least one rotor body arranged on the rotor shaft in a non-rotatable and non-displaceable manner and the stator comprises at least one first stator body, wherein the first stator body has a first stator winding, which is arranged within a first chamber which is enclosed at least partially by a delimiting first housing component. An electric connection element is arranged in the first housing component, which connection element has a contacting body and a receiving sleeve which extend through the housing component in such a manner that a first section of the receiving sleeve projects into the first chamber and a second section of the contacting body can be contacted from the side of the first housing component facing away from the first chamber. The contacting body is fixed in the receiving sleeve and the receiving sleeve is received in the first housing component.

According to the disclosure, by means of the electric machine, a division of the functions of electrical conduction as well as force absorption of the electric connection element can, in principle, be provided, so that the force flow runs to a decisive extent through the contacting body preferably as an element of mechanically higher load-bearing capacity or strength and the current flow runs to a decisive extent through the receiving sleeve preferably as an element of higher specific electrical conductivity.

For this purpose, the electric connection element preferably has the contacting body, which is fixed in the receiving sleeve by means of a press fit. In particular, it is possible to use a bolt or threaded bushing pressed into the receiving sleeve as a contacting body whose main function is to support the clamping forces, for example via the load-bearing cross-section and an undercut. The material of the bolt or threaded bushing advantageously has a higher mechanical strength (yield point) than the material of the receiving sleeve. For its part, the receiving sleeve preferably has a higher specific electrical conductivity in comparison with the contacting body. On the other hand, the material of the receiving sleeve is softer and therefore has a lower mechanical strength (yield point) than the material of the contacting body.

The contacting body, designed as a bolt or threaded bushing, is preferably pressed into the housing component in such a way that the softer material is elastically and plastically deformed so that the sealing effect is sufficient in order to seal off the two chambers on either side of the housing component from one another or one chamber from the environment. For this purpose, the contacting body, for example the bolt or threaded bushing, is preferably provided with a cross-sectional expansion designed for forming the softer material. The elastic portion of the forming ensures that the contact pressure is maintained, while the plastic part of the forming extends the sealing distances in the region provided for this purpose. In this regard, excess material of the receiving sleeve is received in a region provided for this purpose. At the same time, the cross-sectional expansion of the contacting body, for example of the bolt or threaded bushing, creates an undercut that counteracts the withdrawal of the receiving sleeve. The chamber for receiving the excess material during the press fit process can preferably also be fitted with additional sealants or sealing elements, thus further increasing the sealing effect.

The receiving sleeve with the pressed-in contacting body, for example the bolt or threaded bushing, is particularly preferably mounted in an electrically insulated manner in the housing component. For this purpose, for example, either the housing component can be made of an electrically poorly conducting material or an insulating material, or it can be inserted into an electrically non-conductive adapter that provides the electrical insulation effect between the housing component and the assembly consisting of the contacting body and receiving sleeve. The sealing effect can be achieved, for example, by means of sealing elements between the receiving sleeve and the adjacent housing component or adapter.

First, the individual elements according to the disclosure are explained in the order in which they are named in the claims and particularly preferred embodiments of the subject matter according to the disclosure are described below.

Electric machines are used to convert electrical energy into mechanical energy and/or vice versa, and generally comprise a stationary part referred to as a stator or armature, and a part referred to as a rotor and arranged movably relative to the stationary part. In the case of electric machines designed as rotation machines, a distinction is made in particular between radial flux machines and axial flux machines. A radial flux machine is characterized in that the magnetic field lines extend in the radial direction in the air gap formed between rotor and stator, while in the case of an axial flux machine the magnetic field lines extend in the axial direction in the air gap formed between rotor and stator. The electric machine according to the disclosure can be designed as an axial flux machine or radial flux machine.

The stator of the electric machine can be designed in particular as a stator for a radial flux machine. The stator of a radial flux machine is usually constructed cylindrically and preferably consists of electrical laminations that are electrically insulated from one another and are constructed in layers and packaged to form laminated cores. Distributed over the circumference, grooves or channels can be embedded into the electrical lamination running parallel to the rotor shaft, and can receive the stator winding or parts of the stator winding. The stator designed for a radial flux machine can be designed as a stator for an internal rotor or external rotor. With an internal rotor, for example, the stator teeth extend radially inward, while with an external rotor they extend radially outward.

The electric machine according to the disclosure is intended in particular for use within a drive train of a hybrid or fully electric motor vehicle. In particular, the electric machine is dimensioned in such a way that vehicle speeds of more than 50 km/h, preferably more than 80 km/h and in particular more than 100 km/h can be achieved. The electric machine particularly preferably has an output of more than 30 KW, preferably more than 50 KW and in particular more than 70 KW. Furthermore, it is preferred that the electric machine provides speeds greater than 5,000 rpm, particularly preferably greater than 10,000 rpm, very particularly preferably greater than 12,500 rpm.

A stator winding is an electrically conductive conductor whose longitudinal extension is considerably greater than its extension perpendicular to the longitudinal extension. The stator winding can generally have any cross-sectional shape. Rectangular cross-sectional shapes are preferred, as these allow for high packing densities and consequently high power densities to be achieved. Particularly preferably, a stator winding is formed of copper. Preferably, a stator winding has an insulation. To insulate the stator winding, for example, mica paper, which for mechanical reasons can be reinforced by a glass fabric bearer, may be wound in tape form around one or more stator windings, which are impregnated by means of a curing resin. In principle, it is also possible to use a curable polymer or a paint layer without a mica paper to insulate a stator winding.

According to an advantageous embodiment according to the disclosure, the electric machine can be designed as an axial flux machine, comprising the rotor rotatably mounted relative to the stator in a dry chamber, wherein the rotor has the rotor shaft with at least the first rotor body designed in the shape of a disc, arranged on the rotor shaft in a non-rotatable and non-displaceable manner, wherein the stator comprises the first stator body in the shape of an annular disc and the second stator body in the shape of an annular disc, which are arranged coaxially with respect to one another and with respect to the rotor shaft and are axially spaced apart from one another with the interposition of the rotor. The advantage of this design is that the electric machine can be designed to be axially very compact.

The magnetic flux in such an electric axial flux machine (AFM), such as an electric drive machine of a motor vehicle designed as an axial flux machine, is directed axially to a direction of rotation of the rotor of the axial flux machine in the air gap between the stator and the rotor. Various types of axial flux machines exist. One known type is what is termed an I arrangement, in which the rotor is arranged so as to be axially adjacent to a stator or between two stators. Another known type is what is termed an H arrangement, in which two rotors are arranged on opposite axial sides of a stator. In the context of the present disclosure, an I arrangement is preferred.

According to a further preferred further development, a hydraulic connecting element can be formed from an electrically non-conductive material. It can thus be achieved that a good electrical insulation effect can be provided with respect to electrically conductive components of the electric machine.

Furthermore, according to a likewise advantageous embodiment, the hydraulic connecting element can have a substantially cylindrical ring-like spatial shape.

According to a further particularly preferred embodiment, the hydraulic connecting element can be positioned radially above the first stator body and/or the second stator body.

Furthermore, the disclosure can also be further developed in that the hydraulic connecting element has a first seal that seals the first hydraulic chamber from the dry chamber of the rotor and/or the hydraulic connecting element has a second seal that seals the second hydraulic chamber from the dry chamber of the rotor. In a likewise preferred embodiment and in this context, the first seal and/or the second seal can be formed integrally with the hydraulic connecting element.

It can also be advantageous to develop the disclosure further in that the hydraulic connecting element is connected by means of a press fit to a first housing component delimiting the first hydraulic chamber at least partially and/or the hydraulic connecting element is connected by means of a press fit to a second housing component delimiting the second hydraulic chamber at least partially.

According to a further preferred embodiment, a plurality of hydraulic connecting elements can be arranged in a circumferentially distributed manner between the first hydraulic chamber and the second hydraulic chamber.

Finally, the disclosure can also be advantageously implemented in that the hydraulic connecting elements are designed to be substantially identical, thereby reducing component complexity and thus manufacturing costs of the electric machine.

It is also preferable that the winding ends of the axial flux machine run in such a way that, when assembled, the winding ends are oriented parallel or approximately parallel to the main axis of the machine. During assembly, the winding ends are preferably guided to one of the end faces of the axial flux machine through local clearances of the axial flux machine provided for this purpose and designed accordingly, and are suitably connected electrically and mechanically after the corresponding machine parts have been pushed together axially. In a particularly preferred manner, the winding ends of the stators connected in this manner are guided to the axially positioned phase connections via connecting conductors on the end face. These connecting conductors can be seamlessly connected to the winding by winding ends or suitably electrically and mechanically connected to the winding. The star point(s) of the machine are preferably not provided up to the phase connection in this regard.

According to an advantageous embodiment, the material of the contacting body can have a higher yield point than the material of the receiving sleeve. According to a further preferred further development, the material of the receiving sleeve can have a higher specific electrical conductivity than the material of the contacting body. In particular, this allows for good plastic bonding of the receiving sleeve to a surrounding housing component and to the contacting body, while at the same time providing a good insulation effect.

Furthermore, according to an equally advantageous embodiment, the first section of the contacting body can be formed as a bolt, in particular a threaded bolt, so that an assembly-safe screw connection can be provided. According to a further particularly preferred embodiment, the first section of the contacting body can be designed as a bushing, in particular as a threaded bushing, whereby an assembly-safe screw connection can be implemented here as well.

Furthermore, the disclosure can also be further developed in that the press fit between the contacting body and the receiving sleeve has at least one undercut, so that axial forces in particular can be at least partially supported in this manner.

In a likewise preferred embodiment, the contacting body can have a circumferential groove in the region of the press fit, in which plastically deformed material of the receiving sleeve is received during the formation of the press fit, thereby providing additional axial securing of the contacting body relative to the receiving sleeve.

It can also be advantageous to develop the disclosure further in that the receiving sleeve has a seal on its outer lateral surface, by means of which the receiving sleeve is sealed off from the housing component, whereby the sealing effect can be further optimized.

According to a further preferable embodiment of the disclosed subject matter, the electric machine can be designed as an axial flux machine, in which the rotor is rotatably mounted in a dry chamber, wherein the rotor shaft has at least a first rotor body which is designed in the shape of a disc and is arranged on the rotor shaft in a non-rotatable and non-displaceable manner, and the stator comprises a first stator body in the shape of an annular disc and a second stator body in the shape of an annular disc, which are arranged coaxially with respect to one another and with respect to the rotor shaft and are axially spaced apart from one another with the interposition of the rotor, wherein the first stator body has a first stator winding and the second stator body has a second stator winding, and the first stator winding is arranged within a first hydraulic chamber and the second stator winding is arranged within a second hydraulic chamber, within which the respective stator windings can each be contacted at least partially by a hydraulic fluid.

BRIEF DESCRIPTION OF THE DRAWINGS

The disclosure will be explained in more detail below with reference to figures without limiting the general concept of the disclosure.

In the figures.

DETAILED DESCRIPTION

Figure 1:
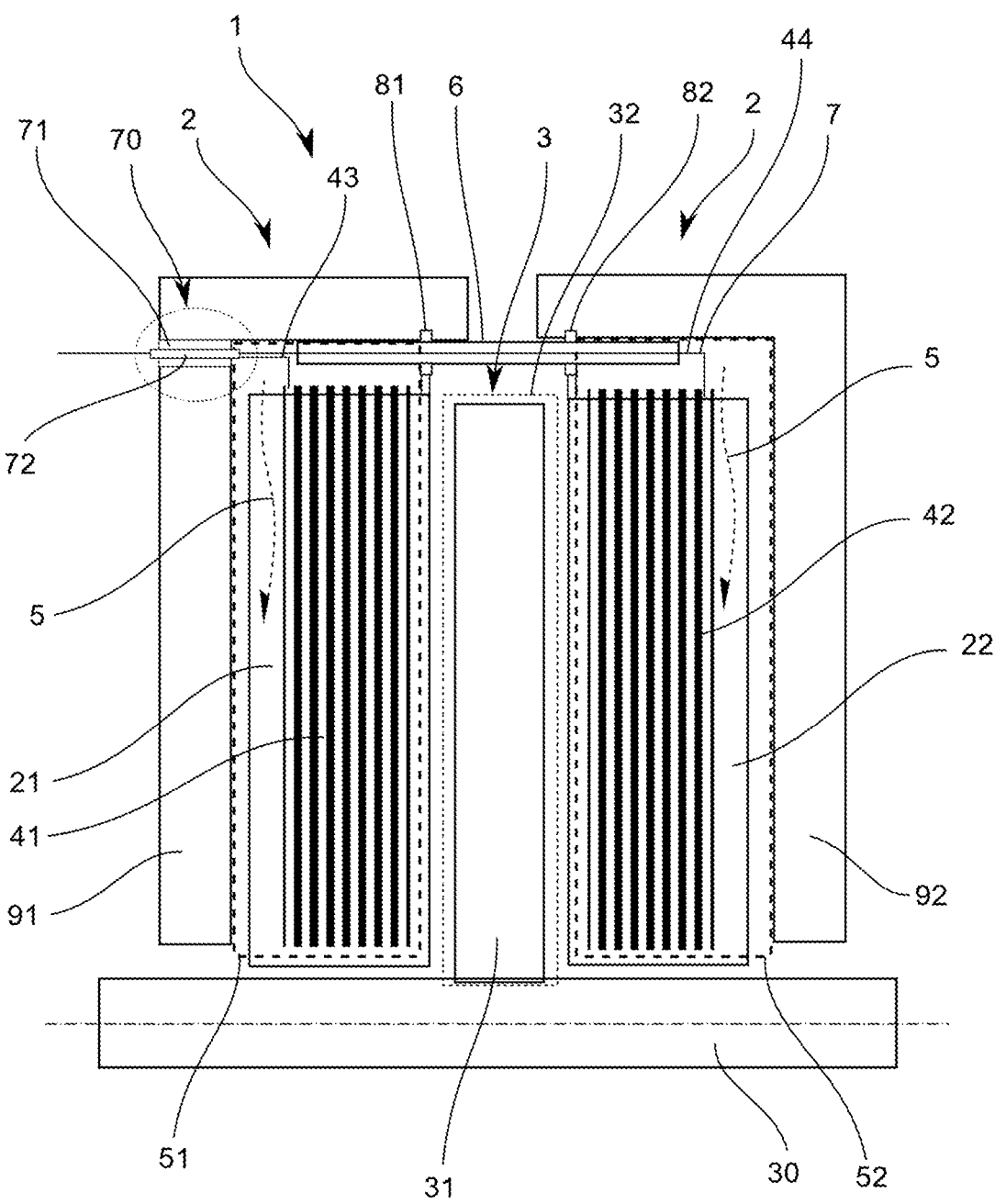
FIG. 1 shows an electric axial flux machine in a schematic axial sectional view.
Figure 3:
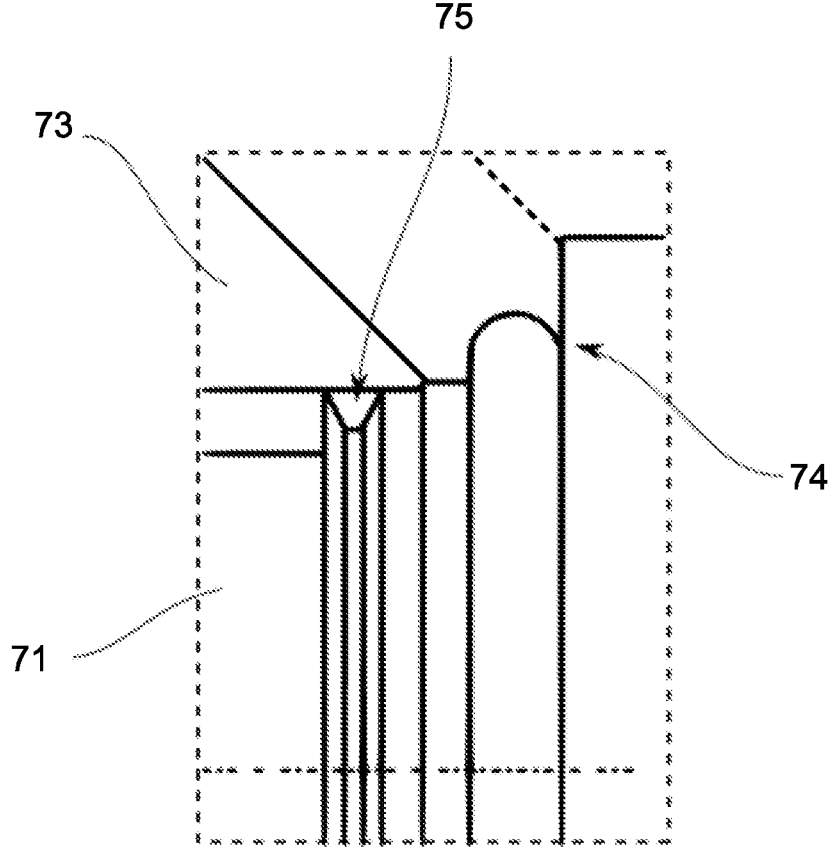
FIG. 3 shows a detailed view of a press fit between the receiving sleeve and contacting body in a schematic sectional view.
Figure 4:
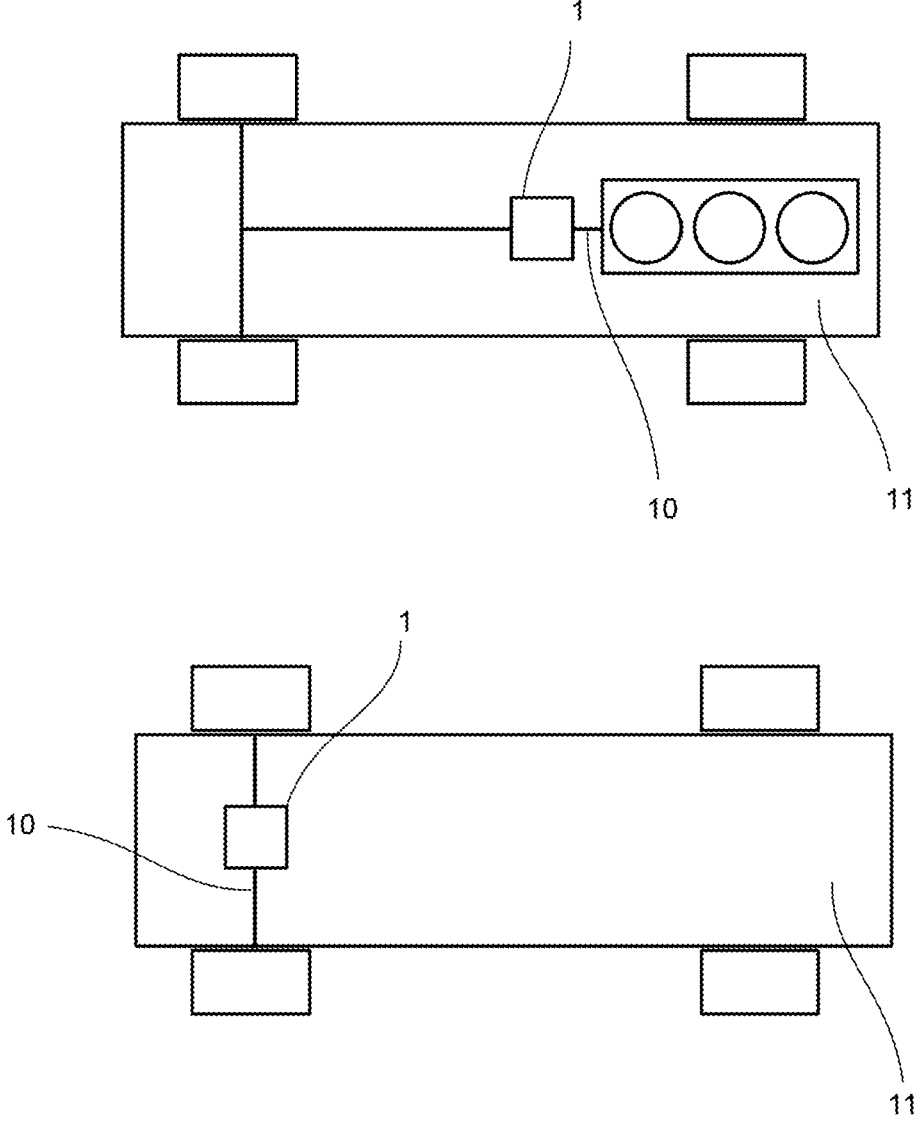
FIG. 4 shows a motor vehicle with an electric machine in schematic block diagrams.

FIG. 1 shows an electric machine 1 for an electrically operated drive train 10 of a motor vehicle 11, as shown by way of example in FIG. 3. The upper illustration of FIG. 3 shows the drive train 10 of a hybrid driven motor vehicle 11 and the lower illustration shows the drive train of a fully electrically driven motor vehicle 11, each with an electric machine 1.

The electric machine 1 comprises a rotor 3 rotatably mounted relative to a stator 2, wherein the rotor 3 has a rotor shaft 30 with at least one rotor body 31 arranged on the rotor shaft 30 in a non-rotatable and non-displaceable manner. The stator 2 has a first stator body 21, wherein the first stator body 21 has a first stator winding 41, which is arranged within a first hydraulic chamber or wet chamber 51, within which the first stator winding 41 can be contacted at least partially by a hydraulic fluid 5, and wherein the first hydraulic chamber 51 is enclosed at least partially by a delimiting first housing component 91.

It is further apparent from FIG. 1 that the electric machine is designed as an axial flux machine 1, in which the rotor 3 is rotatably mounted in a dry chamber 32, wherein the rotor shaft 30 has at least a first rotor body 31 which is designed in the shape of a disc and is arranged on the rotor shaft 30 in a non-rotatable and non-displaceable manner, and the stator 2 comprises a first stator body 21 in the shape of an annular disc and a second stator body 22 in the shape of an annular disc, which are arranged coaxially with respect to one another and with respect to the rotor shaft 30 and are axially spaced apart from one another with the interposition of the rotor 3, wherein the first stator body 21 has a first stator winding 41 and the second stator body 22 has a second stator winding 42, and the first stator winding 41 is arranged within a first hydraulic chamber 51 and the second stator winding 42 is arranged within a second hydraulic chamber or wet chamber 52, within which the respective stator windings 41,42 can each be contacted at least partially by a hydraulic fluid 5.

Figure 2:
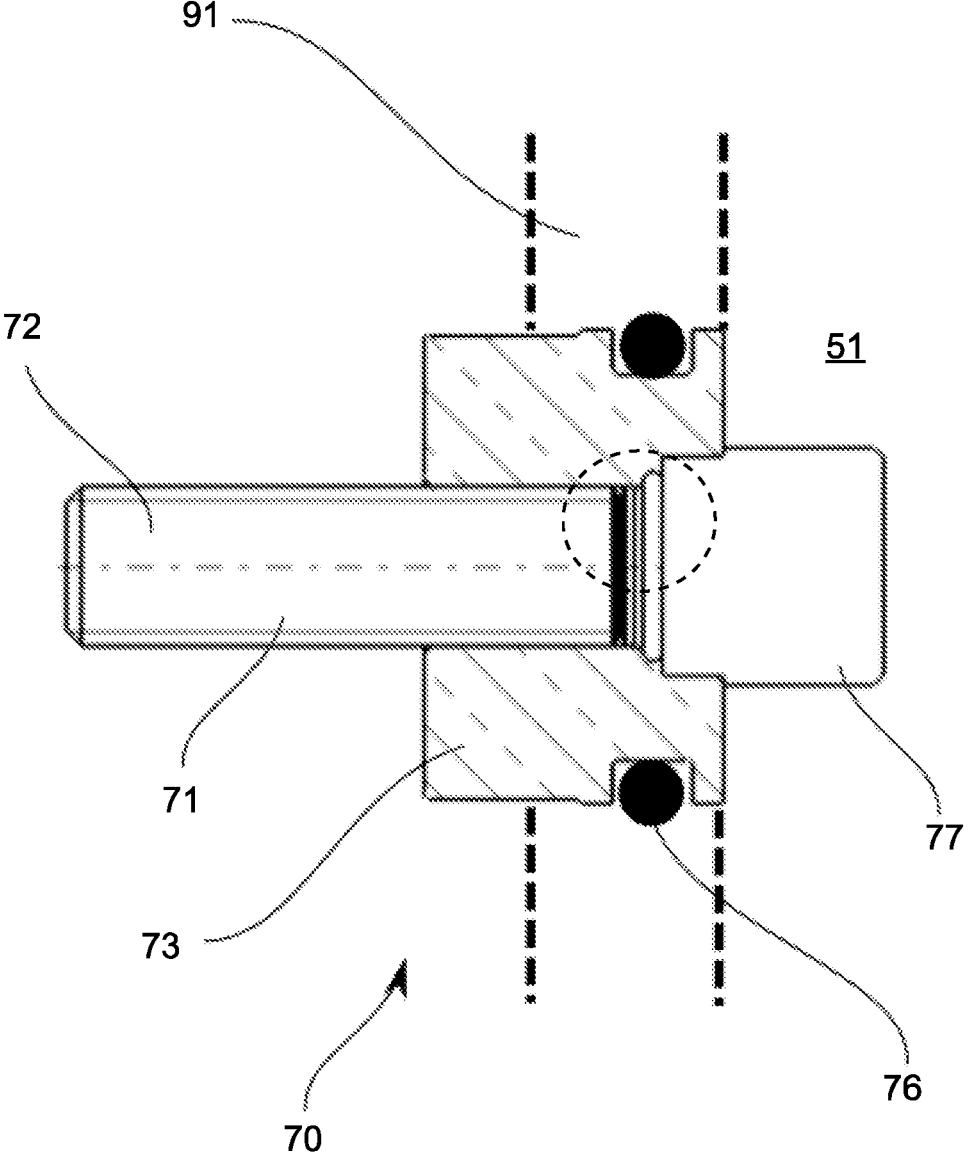
FIG. 2 shows a detailed view of an electric connection element in a schematic sectional view.

As can be seen in FIG. 2, an electric connection element 70 is arranged in the first housing component 91, which connection element has a contacting body 71 and a receiving sleeve 73 which extend through the housing component 91 in such a manner that a first cylindrical section 77 of the receiving sleeve 77 projects into the first hydraulic chamber 51 and a second cylindrical section 72 of the contacting body 71 can be contacted from the side of the first housing component 91 facing away from the first hydraulic chamber 51. The contacting body 71 is fixed by means of a circumferentially closed press fit in a receiving sleeve 73, which in turn is received by means of a press fit in the first housing component 91. The second section 72 of the contacting body 71 is formed as a bolt, in particular a threaded bolt. Alternatively, it would also be possible for the second section 72 of the contacting body 71 to be designed as a bushing, in particular as a threaded bushing. The contacting body 71 runs axially parallel to the axis of rotation of the rotor 30 in its longitudinal extension.

The electric connection element 70 is connected to one or more of the electric conductors 7 of the stator windings 41,42 in the direction of the first or second hydraulic chamber 51,52. In particular, electric conductors 7 of the same phase can be connected to an electric connection element 70. This is the case in the exemplary embodiment shown in FIG. 1. The first winding ends 43 of the first stator winding 41 and the second winding ends 42 of the second stator winding 42 assigned to the same phase are electrically as well as mechanically connected to the electric connection element 70. The connection to the second section 77 of the receiving sleeve 73 can be made by soldering or welding, for example, or by means of a detachable connection such as by means of a tension clamp.

The first stator winding 41 has first winding ends 43 emerging from the first stator body 21, which extend radially above the stator body 21 in the axial direction. The second stator winding 42 also has second winding ends 44 emerging from the second stator body 22, which extend radially above the first stator body 21 and the second stator body 22 in the axial direction. The first hydraulic chamber 51 is at least partially enclosed by a delimiting first housing component 91, which has a plurality of circumferentially distributed openings 13,14 for passage of the second winding ends 44.

The first winding ends 43 are arranged on a circular path having a first diameter and the second winding ends 44 are arranged on a circular path having a second diameter, wherein the first diameter is different from the second diameter.

The first winding ends 43 and the second winding ends 44 are oriented toward the same axial end face of the axial flux machine 1 and are interconnected at the same axial end face of the axial flux machine 1. The first stator winding 41 and the second stator winding 42 are each configured to be at least three-phase with a star point connection.

The electric machine 1 further has a plurality of hydraulic connecting elements 6, which hydraulically connect the first hydraulic chamber 51 to the second hydraulic chamber 52. At least one electric conductor 7 each of the second stator winding 42 is arranged within the hydraulic connecting elements 6. The plurality of substantially identically designed hydraulic connecting elements 6 are arranged in a circumferentially distributed manner between the first hydraulic chamber 51 and the second hydraulic chamber 52.

The material of the contacting body 71 has a higher yield point than the material of the receiving sleeve 73, while the material of the receiving sleeve 73 has a higher specific electrical conductivity than the material of the contacting body 71.

It is clearly evident from FIG. 3 that the press fit between the contacting body 71 and the receiving sleeve 73 has at least one undercut 74, so that an improved axial force absorption can be provided in this manner. What can also be seen from FIG. 3 is that the contacting body 71 has a circumferential groove 75 in the region of the press fit, into which plastically deformed material of the receiving sleeve 73 can flow during the press fit process and thus also provide improved axial securing of the contacting body 71 relative to the receiving sleeve.

The contacting body 71, designed as a bolt, is thus pressed into the housing component 91 in such a way that the softer material is elastically and plastically deformed so that the sealing effect is sufficient in order to seal off the two chambers on either side of the housing component 91 from one another or one chamber from the environment. For this purpose, a cross-sectional expansion is provided on the contacting body 71, which is designed for forming the softer material. The elastic portion of the forming ensures that the contact pressure is maintained, while the plastic part of the forming extends the sealing distances in the region provided for this purpose. In this regard, excess material of the receiving sleeve 73 is received by the groove 75. At the same time, the cross-sectional expansion of the contacting body 71 creates an undercut 74 that counteracts the withdrawal of the receiving sleeve 73.

FIG. 2 also shows that the receiving sleeve 73 has a seal 76 on its outer lateral surface, by means of which the receiving sleeve 73 is sealed off from the housing component 91. In principle, it would also be conceivable for the seal 76 to have an axial sealing fit rather than a radial sealing fit as shown in FIG. 2.

The disclosure is not limited to the embodiments shown in the figures. The above description is therefore not to be regarded as limiting, but rather as illustrative. The following claims are to be understood as meaning that a named feature is present in at least one embodiment according to the disclosure. This does not exclude the presence of further features. If the patent claims and the above description define 'first' and 'second' features, this designation serves to distinguish between two features of the same type without defining an order of precedence.

LIST OF REFERENCE SYMBOLS

1 Electric machine
2 Stator
3 Rotor
4 Stator winding
6 Connecting elements
7 Connection element
9 Housing component
10 Drive train
11 Motor vehicle
21 Stator body
22 Stator body
30 Rotor shaft
31 Rotor body
32 Dry chamber
41 Stator winding
42 Stator winding
43 Winding ends
44 Winding ends
51 Hydraulic chamber
52 Hydraulic chamber
70 Connection element
71 Contacting body
72 Section
73 Receiving sleeve
74 Undercut
75 Groove
76 Seal
77 Section
81 Seal
82 Seal
91 Housing component
92 Housing component

The invention claimed is:

1. An electric machine, comprising:
a stator;
a rotor rotatably mounted relative to the stator, the rotor has a rotor shaft with at least one rotor body arranged on the rotor shaft in a non-rotatable and non-displaceable manner;
the stator comprises a first stator body that has a first stator winding which is arranged within a first chamber which is enclosed at least partially by a delimiting first housing component;

an electric connection element arranged in the first housing component, the connection element has a contacting body and a receiving sleeve which extends through the housing component such that a first section of the contacting body projects into the first chamber and a second section of the contacting body is contactable from a side of the first housing component facing away from the first chamber; and
the contacting body is fixed in the receiving sleeve by a circumferentially closed press fit and the receiving sleeve is received in the first housing component;
wherein the press fit between the contacting body and the receiving sleeve has at least one undercut, which is formed by a cross-sectional expansion of the contacting body and counteracts withdrawal of the receiving sleeve.

2. The electric machine according to claim 1, wherein the contacting body has a circumferential groove in a region of the press fit.

3. The electric machine according to claim 1, wherein a material of the contacting body has a higher yield point or strength than a material of the receiving sleeve.

4. The electric machine according to claim 1, wherein a material of the receiving sleeve has a higher specific electrical conductivity than a material of the contacting body.

5. The electric machine according to claim 1, wherein the first section of the contacting body is formed as a bolt.

6. The electric machine according to claim 1, wherein the first section of the contacting body comprises a bushing.

7. The electric machine according to claim 1, wherein the receiving sleeve has a seal on an outer lateral surface thereof, by which the receiving sleeve is sealed off from the housing component.

8. The electric machine according to claim 1, wherein the electric machine is an axial flux machine, the rotor is rotatably mounted in a dry chamber, the rotor body is disc-shaped and the first stator body has an annular disc-shape, and the rotor body and the first stator body are arranged coaxially with respect to the rotor shaft.

9. The electric machine according to claim 8, wherein the stator has a second stator body with an annular disc-shape, which is arranged coaxially with respect to the rotor shaft and has a second stator winding, which is arranged within a second chamber, and the first annular disc-shaped stator body and the second annular disc-shaped stator body are axially spaced apart from one another with the rotor interposed therebetween.

10. The electric machine according to claim 9, wherein the second chamber is a second hydraulic chamber within which the second stator winding is contactable at least partially by a hydraulic fluid.

11. The electric machine according to claim 10, wherein the first chamber is a first hydraulic chamber within which the first stator winding is contactable at least partially by a hydraulic fluid.

12. An electric machine, comprising:
a stator;
a rotor rotatably mounted relative to the stator;
the stator comprises a first stator winding which is arranged within a first chamber which is enclosed at least partially by a delimiting first housing component;
an electric connection element arranged in the first housing component, the connection element has a contacting body and a receiving sleeve which extends through the first housing component such that a first section of the contacting body projects into the first chamber and a second section of the contacting body is contactable from a side of the first housing component facing away from the first chamber; and the contacting body is fixed in the receiving sleeve by a circumferentially closed press fit and the receiving sleeve is received in the first housing components;

wherein the press fit between the contacting body and the receiving sleeve has at least one undercut, which is formed by a cross-sectional expansion of the contacting body and counteracts withdrawal of the receiving sleeve.

13. The electric machine according to claim 12, wherein the contacting body has a circumferential groove in a region of the press fit.

14. The electric machine according to claim 12, wherein a material of the contacting body has a higher yield point or strength than a material of the receiving sleeve.

15. The electric machine according to claim 12, wherein a material of the receiving sleeve has a higher specific electrical conductivity than a material of the contacting body.

16. The electric machine according to claim 12, wherein the first section of the contacting body is formed as a threaded bolt, or the first section of the contacting body comprises a bushing.

* * * * *